United States Patent
Eisenbeis

(10) Patent No.: US 10,024,690 B2
(45) Date of Patent: Jul. 17, 2018

(54) INCREMENTAL ROTARY ENCODER USING HALL EFFECT SENSORS AND MAGNETIC DETENTS

(71) Applicant: Texas Instruments Incorporated, Dallas, TX (US)

(72) Inventor: Ross N. Eisenbeis, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 5 days.

(21) Appl. No.: 14/974,420

(22) Filed: Dec. 18, 2015

(65) Prior Publication Data

US 2016/0305795 A1 Oct. 20, 2016

Related U.S. Application Data

(60) Provisional application No. 62/147,130, filed on Apr. 14, 2015.

(51) Int. Cl.
*G01B 7/30* (2006.01)
*G01D 5/14* (2006.01)
*G01D 7/00* (2006.01)

(52) U.S. Cl.
CPC ............ *G01D 5/145* (2013.01); *G01D 7/007* (2013.01)

(58) Field of Classification Search
CPC ........ G01D 5/145; G01D 5/147; G01D 5/244; G01D 5/2457; G01D 5/2449; G01D 7/007; G01P 3/46; G01P 3/487; G01P 3/488

See application file for complete search history.

(56) References Cited

U.S. PATENT DOCUMENTS

| | | | | |
|---|---|---|---|---|
| 6,752,134 B1 * | 6/2004 | Wilkinson | ............ | F02P 3/0453 123/406.58 |
| 6,954,063 B2 * | 10/2005 | Kinpara | ................ | G01D 5/145 324/174 |
| 7,378,842 B2 * | 5/2008 | Babin | .................. | G01D 5/145 324/207.2 |
| 8,174,155 B2 * | 5/2012 | Fullerton | ................. | G09F 7/04 310/49.01 |
| 8,604,780 B2 * | 12/2013 | Saruki | ................. | G01R 33/091 324/207.12 |
| 9,316,508 B2 * | 4/2016 | LaCroix | ................. | G01D 5/244 |
| 2006/0028203 A1 * | 2/2006 | Kawashima | ........... | G01D 5/145 324/207.25 |
| 2007/0108968 A1 * | 5/2007 | Ootawara | ............... | F02D 9/105 324/207.25 |

(Continued)

*Primary Examiner* — Minh N Tang
(74) *Attorney, Agent, or Firm* — Lawrence J. Bassuk; Charles A. Brill; Frank D. Cimino

(57) ABSTRACT

A rotary encoder and rotary encoder system that provides rotation detection and generates tactile feedback using a single magnetic mechanism and without relying on mechanical detects. The rotary encoder utilizes a ring magnet attached to a knob, two Hall Effect sensors that detect movement information for the processor, and magnets that are mounted to the surface of the platform. As the knob and multipole ring magnet get rotated, the ring magnet is subjected to opposing forces due to the magnets mounted to the platform surface, causing an unstable position that is experienced as tactile feedback by the user rotating the knob. Releasing the knob snaps the magnetic ring into one of many fixed positions, thus providing further tactile feedback.

5 Claims, 3 Drawing Sheets

(56) References Cited

U.S. PATENT DOCUMENTS

2010/0050731 A1* 3/2010 Granig ................. G01D 5/145
73/1.11
2013/0021025 A1* 1/2013 Krishnaiah ............. G01B 7/30
324/207.25

* cited by examiner

INCREMENTAL ROTARY ENCODER USING HALL EFFECT SENSORS AND MAGNETIC DETENTS

CROSS-REFERENCE TO RELATED APPLICATIONS

The present application claims the benefit of the filing date of Provisional Application No. 62/147,130, filed Apr. 14, 2015.

TECHNICAL FIELD

The recited claims are directed, in general, to rotary encoders and, more specifically, to rotary encoders providing tactile feedback using magnetic detents.

BACKGROUND

When a human-interface knob is rotated, a sensing mechanism is required to determine properties of the rotation, such as the position of the rotated knob, the direction of rotation and the speed of the rotation. These sensing mechanisms employed by human-interface knobs may be implemented using an incremental rotary encoder that produces electrical signals that describe the properties of the rotation. This sensed information describing the rotation of the knob is then communicated to a logic unit capable of processing this information. Based on this processing, various responses may result depending on the particular system of which the knob is a component. One possible application is a volume knob that can be rotated freely in either direction.

For certain knobs, tactile feedback is desirable since the feedback informs the user of each increment that the knob is turned. In some cases, this feedback may include the use of variable resistance in the rotation of the knob such that certain discrete knob positions are provided for the user, thus improving the ability of the user to accurately and quickly rotate the knob to certain positions. In conventional knobs, tactile feedback is generated mechanically. In conventional mechanical knobs, tactile feedback is implemented using detents, such as interlocking ridges or bent metal, to create a number of stable positions throughout the rotation of the knob. When the knob is rotated, these detents create sectors of high and low resistance in the rotation of the knob. Thus, detents provide tactile feedback during the rotation of the knob and define the discrete positions to which the knob will snap.

These conventional knobs that use mechanical contacts have several disadvantages. Mechanical detents, such as ridges or other structures formed of plastic or metal, wear out with use of the knob. Eventually, all tactile feedback provided by the knob may be lost. In some cases, uneven wear may result in operator error due to inconsistent tactile feedback at different knob positions. The tactile feedback provided using mechanical detents may also be compromised due to corrosion and foreign matter such as dirt impacting the feedback provided by the knob. Creating a system of mechanical detents may also require the generation of complex three-dimensional designs and associated manufacturing processes.

SUMMARY OF THE INVENTION

According to various aspects of the application a rotary encoder is provided that includes a magnetic mechanism that provides tactile feedback using magnetic detents. The magnetic mechanism of the rotary encoder is also used to detect the properties of the rotation of the encoder. As such, embodiments generate tactile feedback without relying on mechanical structures.

A rotary encoder and rotary encoder system according to various embodiments are described. The rotary encoder provides tactile feedback and is comprised of: a knob attached to a multipole ring magnet, the knob rotates the multipole ring magnet above a stationary surface; the multipole ring magnet comprised of alternating polarity sectors; the stationary surface comprising a plurality of stationary magnets and a plurality of magnetic field sensor integrated circuits; the plurality of magnetic field sensor integrated circuits, each magnetic field sensor is configured to detect a magnetic field generated during the rotation of the polarity sectors of the multipole ring magnet and further configured to generate an output signal; and the plurality stationary magnets configured to interact with the polarity sectors of the multipole ring magnet to generate tactile feedback in the knob rotation.

According to various additional embodiments, the plurality of magnetic field sensors are Hall effect sensors. According to various additional embodiments, the rotary encoder further comprises a processor configured to determine properties of the rotation of the knob based on the output signals generated by the plurality of magnetic field sensors. According to various additional embodiments, the generated tactile feedback includes detent positions created by the magnetic attraction between individual stationary magnets of the plurality of stationary magnets and individual polarity sectors of the multipole ring magnet. According to various additional embodiments, the number of detent positions created is equal to the number of polarity sectors in the multipole ring magnet that are magnetically attracted to a first stationary magnet of the plurality of stationary magnets. According to various additional embodiments, the detent positions provide selectable knob positions. According to various additional embodiments, the plurality of stationary magnets are separated along the stationary surface by an integer number of polarity sectors of the multipole ring magnet. According to various additional embodiments, the stationary magnets are the width of the polarity sectors of the multipole ring magnet. According to various additional embodiments, the at least one stationary magnet has a north pole facing the multipole ring magnet and at least one stationary magnet has a south pole facing the multipole ring magnet. According to various additional embodiments, the magnetic field sensors are separated along the stationary surface such that the generated output signals are quadrature signals.

BRIEF DESCRIPTION OF THE DRAWINGS

Figure 1:
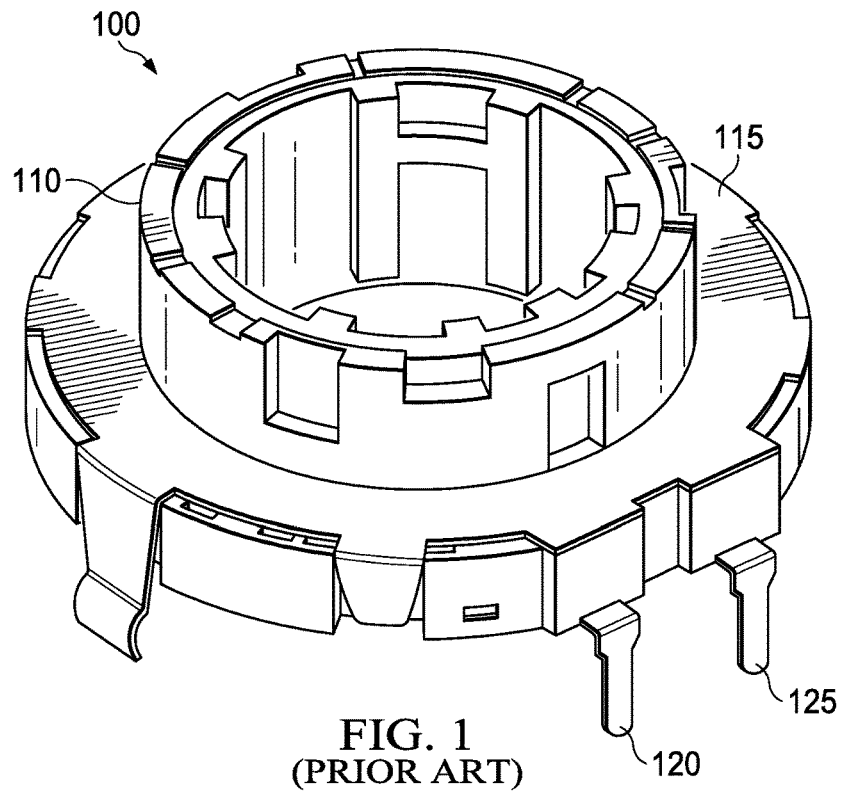

Having thus described the invention in general terms, reference will now be made to the accompanying drawings, wherein:

FIG. 1 depicts certain components of a conventional rotary encoder.

Figure 2:
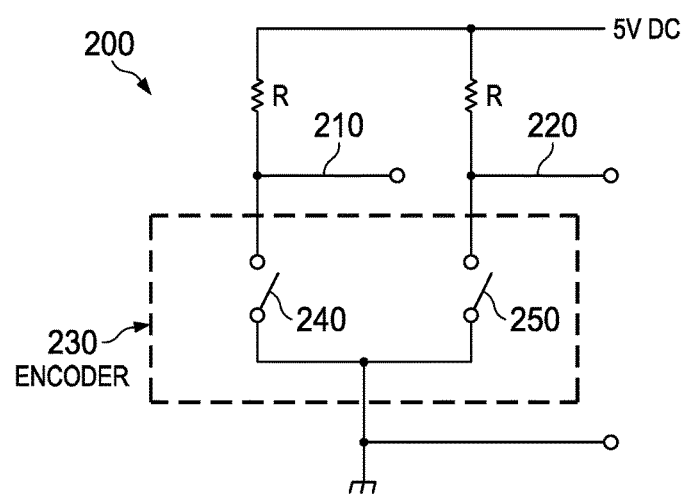

FIG. 2 is a circuit diagram illustrating certain components of a conventional rotary encoder circuit.

Figure 3:
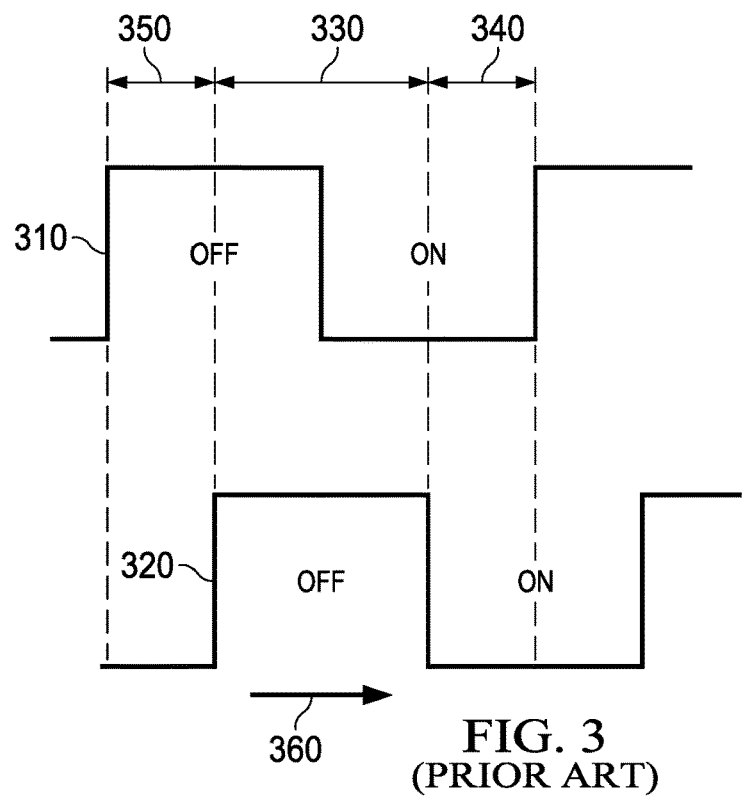

FIG. 3 is a waveform diagram illustrating the operation of a conventional rotary encoder.

Figure 4:
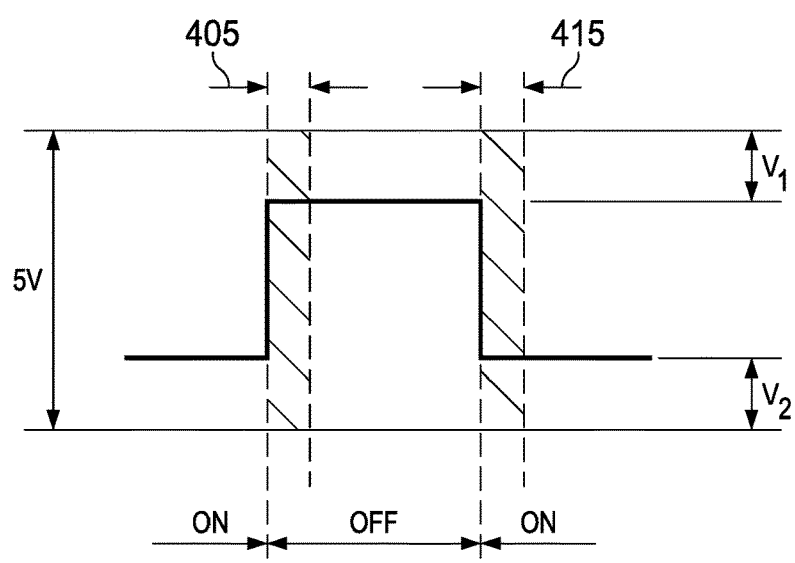

FIG. 4 is a waveform diagram illustrating a specific aspect of the operation of a conventional rotary encoder.

Figure 5:
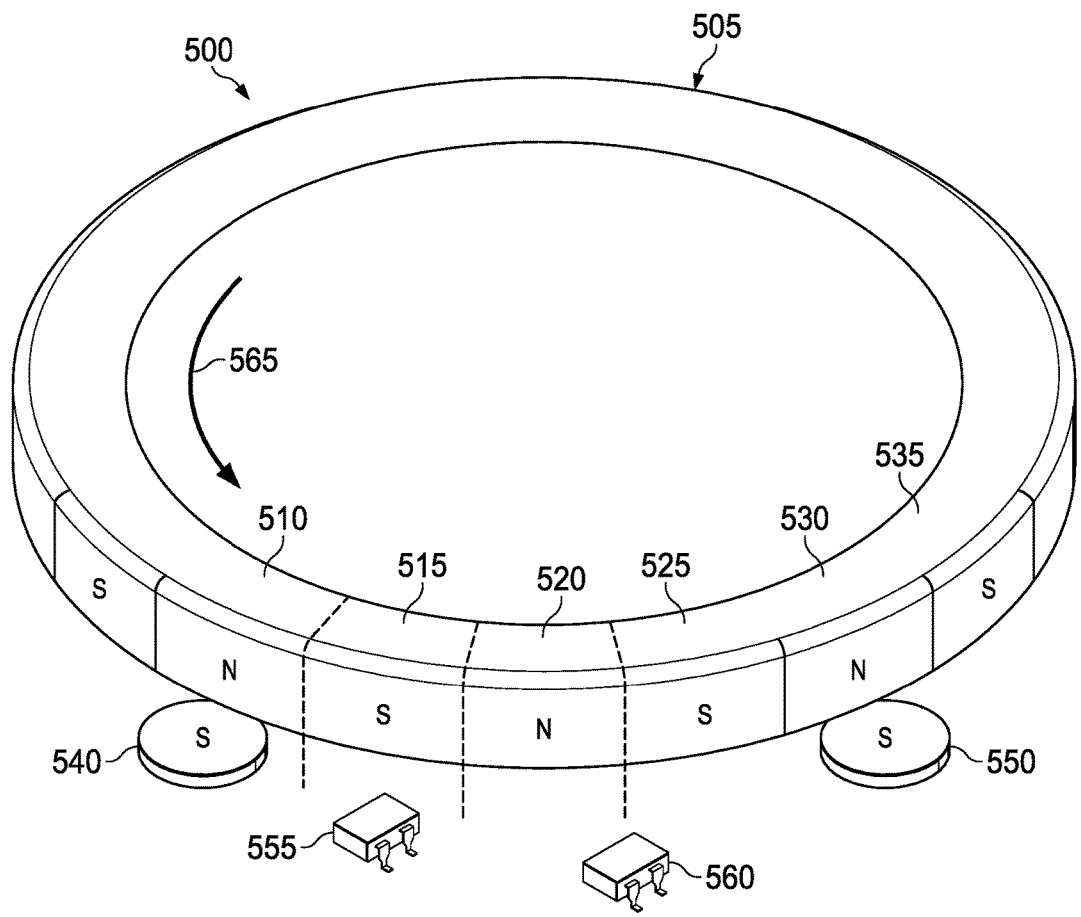

FIG. 5 depicts certain components a rotary encoder according to various embodiments.

Figure 6:
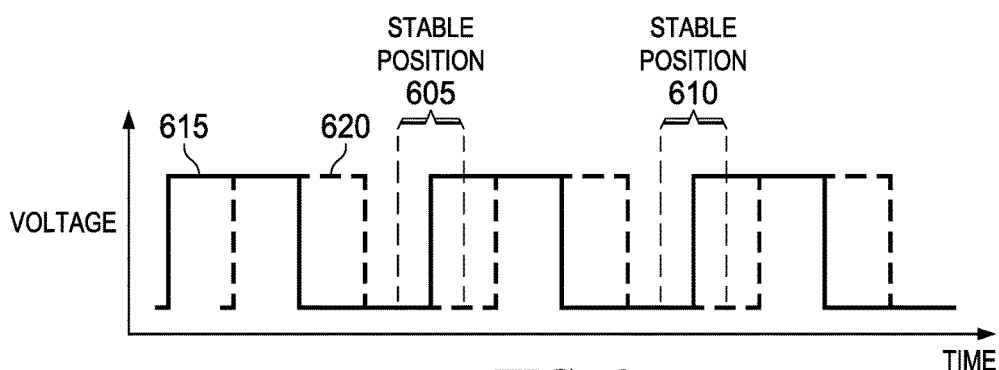

FIG. 6 is a waveform diagram illustrating the operation of a rotary encoder according to various embodiments.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 depicts a conventional rotary encoder 100 that utilizes mechanical structures to create tactile feedback in the rotation of the encoder. The conventional rotary encoder 100 consists of a plastic ring 110 that is attached to a knob that can be rotated as a form of user input in systems such aircraft, home appliances, vehicles, and other electronic equipment. Upon rotation of the knob, the plastic ring 110 rotates within a stationary component 115 of the conventional rotary encoder 100. Within the structure of the stationary component 115, mechanical detents are included. These mechanical detents create tactile feedback in the form alternating stable and unstable plastic ring 110 positions when rotated within the stationary component 115.

The rotation of the conventional rotary encoder 100 is encoded into one or more electrical signals. More specifically, the rotation of the plastic ring 100 is encoded as two output signals, where each of the two generated output signals is provided as an output on one of two terminals 120 and 125 of the rotary encoder. As a conventional rotary encoder, the mechanisms used to detect and encode the properties of the rotation of the knob are separate from the mechanical detent structures used to create the tactile feedback. As described, the tactile feedback is generated using mechanical detent structures such as interlocking metal or plastic ridges. The detection of the rotation in a conventional rotary encoder is generated using metallic brushes that are components of the plastic ring 110. As the plastic ring 110 is rotated, the metallic brushes come into contact with conductive structures that are located at regular intervals along a circumference of the stationary component 115.

In the conventional rotary encoder, a set of metallic brushes of the plastic ring 110 coming in to contact a with a conductive structure of the stationary component 115 results in a logical high signal being output on one of the terminals of the encoder, for instance terminal 120. As the plastic ring 110 is rotated, the set of metallic brushes eventually lose contact with the conductive structure and the output of the terminal 120 transitions to a logical low signal. The plastic ring 110 includes a second set of metallic brushes that are located at a specific interval from the first set of metallic brushes. The second set of metallic brushes likewise generate an output signal that transitions between logical high and logical low states as the brushes come in contact with the conductive structures of the stationary component 115. The output generated by this second set of metallic brushes is provided on the other output terminal 125 of the rotary encoder. In this manner, two output signals are generated that reflect the rotation of the plastic ring 110 within the stationary component 115.

Other types of conventional rotary encoders may utilize different mechanisms besides metallic brushes to encode the rotation of a knob in the form of two digital signals. For instance, a light source, photodetectors and mask may be used whereby the mask is configured to allows light generated by the light source to pass only in certain sectors of the knob rotation. The photodetectors generate output signals based on whether the knob is oriented such that light passes through openings in the mask. Such a system may be configured to allow light to pass through the mask when the detents of the knob are in a stable position or, alternatively, to block light during stable portions of the knob rotation. As with the use of metal brushes, by using two offset light sources, two output signals are generated that reflect the rotation of the knob. The use of light to encode the rotation of the encoder must rely on another mechanism, such as mechanical detents, to create tactile feedback.

FIG. 2 illustrates certain components of a circuit 200 for encoding the rotation of a conventional rotary encoder, such as depicted in FIG. 1. The outputs provided at the two terminals 120 and 125 of the rotary encoder are outputs 210 and 220 of the encoding circuit 200. In the encoding circuit 200, the mechanism of the rotary encoder 230 that generate the two rotation signals, such as the corresponding metallic brushes and conductive surfaces described above, are represented as switches 240 and 250. The toggling of switch 240 generates the output signal 210. The toggling of switch 250 likewise generates the signal 220.

FIG. 3 illustrates two representative waveforms generated using a conventional encoding circuit such as illustrated in FIG. 2 and a conventional rotary encoder such as illustrated in FIG. 1. FIG. 3 includes waveforms 310 and 320, each depicting signals generated as outputs 210 and 220 of a conventional encoding circuit 200. Each of the output signals 310 and 320 transitions between logical high (i.e., OFF) and low (i.e., ON) states as the knob is rotated. For instance, output signal 310 is high when one of the sets of metallic brushes is in contact with a conductive surface and low otherwise. Accordingly, output signal 320 is high when the other set of metallic brushes is in contact with a conductive surface and is otherwise low.

Waveforms 310 and 320 also illustrate certain aspects of the tactile feedback provided by a conventional rotary encoder. For instance, waveforms 310 and 320 reflect certain stable detent positions in the rotation of a conventional rotary encoder. Stable positions in the encoder rotation are present during interval 330 and is in an unstable portion of its rotation during intervals 340 and 350.

The direction of the rotation of the rotary encoder can also be determined based on waveforms 310 and 320. As waveforms 310 and 320 are illustrated in FIG. 3, these waveforms represent clockwise rotation of the knob in direction 360. If the encoder generating the waveforms had been rotated in the counter-clockwise direction, a different order of state transitions would be present between the two signals. In the clockwise rotation illustrated in FIG. 3, a rising edge in signal 310 is followed by a rising edge in signal 320. If rotated counter-clockwise, the relative ordering of the phases of the two signals would be altered such that a rising edge in signal 310 would be followed by a falling edge in signal 320.

FIG. 4 depicts a waveform that illustrates another disadvantage of conventional, mechanical rotary encoders such as described with respect to FIGS. 1-3. For a mechanical encoder that utilizes a mechanism such as the described metallic brushes and conductive surfaces, a masking interval must be allowed at each state transition in order to allow for settling time. For instance, where metallic brushes are used, masking intervals 405 and 415 are provided at each state transition in order to allow time for the brushes to settle upon a conductive surface and the generated output signal to settle at each corresponding state transition. These masking intervals 405 and 415 introduce a settling delay at each state transition of the knob, thus affecting the operation of the knob.

FIG. 5 illustrates certain components of a rotary encoder 500 according to various embodiments. The rotary encoder 500 includes a multipole ring magnet 505, two stationary magnets 540, 550, and two Hall effect sensors 555, 560. The stationary magnets 540, 550 are used to generate detent forces that provide tactile feedback during the operation of the encoder. The stationary magnets 540, 550 are attached to the surface of a platform on which the rotary encoder 500 is mounted such that the alternating poles of the multipole ring magnet 505 rotate near the stationary magnets when the attached knob is rotated by the user. The Hall effect sensors 555, 560 are used to detect the rotation of the multipole ring magnet 505 and generate output signals encoding the rotation properties of a knob attached to the multipole ring magnet.

As illustrated, the multipole ring magnet 505 is comprised of sectors 510, 515, 520, 525, 530 and 535 of alternating polarity such that each polarity sector is adjacent to polarity sectors of the opposite polarity. The multipole ring magnet 505 is attached to a handheld knob, which is not shown in FIG. 5, by which a user rotates the attached multipole ring magnet. As the knob is rotated, the polarity sectors 510, 515, 520, 525, 530 and 535 of the multipole ring magnet 505 are rotated near the stationary magnets 540, 550 and the two Hall effect sensors 555, 560. In certain embodiments, a single Hall effect sensor device may be utilized, where this integrated device supports two independent Hall elements.

Tactile feedback is generated as the multipole ring magnet 505 is rotated. This tactile feedback is generated by alternating repulsing and attracting magnetic forces arising between the polarity sectors of the multipole ring magnet 505 and the stationary magnets 540, 550. For instance, in the illustrated orientation of the multipole ring magnet 505 and the stationary magnets 540, 550, North polarity sector 510 is aligned over a South polarity stationary magnet 540 and North polarity sector 530 is aligned over a South polarity stationary magnet 550. Oriented as such, attractive magnetic forces between the opposing magnets of the multipole ring magnet 505 and the stationary magnets 540, 550 result in a stable position for the multipole ring magnet. In order to rotate the knob in either direction, a user has to apply force sufficient to overcome the magnetic attraction between the opposing magnets of the multipole ring magnet 505 and the stationary magnets 540, 550. As the knob is rotated further such that the stationary magnets 540, 550 are now aligned with polarity sectors of the same polarity, the rotary encoder is in an unstable orientation. In this unstable orientation, the repulsive magnetic forces that result serve to snap the multipole ring magnet to an adjacent stable orientation of the multipole ring magnet 505 and the stationary magnets 540, 550.

In this manner, the magnetic forces between the multipole ring magnet 505 and the stationary magnets 540, 550 generate tactile feedback. More specifically, the user feels resistance when rotating the knob away from a stable position and also feels the snap of the knob from an unstable position to a stable position during further rotation of the knob. Based on the number of polarity sectors that are used in the multipole ring magnet 505, different numbers of stable knob positions per revolution can be provided. The properties of the tactile feedback can be adjusted based on the strength and size of the stationary magnets 540, 550 and the polarity sectors of the multipole ring magnet 505. Other embodiments may use additional or fewer stationary magnets to further adjust the tactile feedback that is provided by the rotary encoder 500.

In certain embodiments, the stationary magnets 540, 550 have a width that matches the width of each of the polarity sectors on the multipole ring magnet 505. For instance, referring to FIG. 5, the stationary magnets 540, 550 are circular magnets that have a diameter approximately equal to the width of the polarity sectors, for instance 510 and 530, the multipole ring magnet 505. Other embodiments may utilize different shapes for the stationary magnets besides the circular magnets utilized in the embodiment of FIG. 5. In other embodiments, the stationary magnets may be smaller than the polarity sectors of the multipole ring magnet. According to various embodiments, stationary magnets 540, 550 are spaced apart on the rotary encoder 500 platform such that that the stationary magnets are separated by an integer number of polarity sectors of the multipole ring magnet 505. This configuration facilitates the stationary magnets all applying forces on the multipole ring magnet in the same direction.

In the rotary encoder 500, stationary magnets 540, 550 are both positioned with their South poles facing upwards towards the multipole ring magnet 505. Other embodiments may instead utilize stationary magnets that are both positioned with their North poles facing upwards. Other embodiments may alternatively position the stationary magnets such that one stationary magnet has its North pole facing upward and the other stationary magnet has its South pole facing upward. In such embodiments, the stationary magnets are repositioned such that the tactile feedback provided by the knob is preserved. For instance, in the embodiment of FIG. 5, if stationary magnet 550 is flipped such that its North pole faces upwards towards the multipole ring magnet 505, stationary magnet 550 will also be repositioned on the stationary platform to sit below a South polarity sector of the multipole ring magnet 505, such as polarity sectors 525 or 535.

In the embodiment of FIG. 5, two Hall effect sensors 555, 560 are used to detect the rotation of the multipole ring magnet 505. Like the stationary magnets 540, 550, the two Hall effect sensors 555, 560 are attached to the surface of the platform on which the rotary encoder 500 is mounted. Each of the Hall effect sensors 555, 560 generates a variable output voltage in response to the changing magnetic field resulting from the rotation of the multipole ring magnet 505 near the sensors. Certain embodiments may utilize Hall effect sensors such as Texas Instruments DRV5013. Other embodiments may utilize other types of Hall effect sensors or other components capable of detecting the rotation of the multipole ring magnet 505 based on the magnetic forces generated by the rotation. Other embodiments may utilize a single integrated Hall effect sensor capable of measuring the magnetic field generated by rotation of the multipole ring magnet 505 at different positions on the platform on which the rotatory encoder 500 is mounted.

When a user rotates the knob attached to the multipole ring magnet 505, each of the Hall effect sensors 555 and 560 produce varying output voltages due to the varying magnetic field resulting from the rotation of the alternating polarity sectors 510, 515, 520, 525, 530, 535 of the multipole ring magnet 505 near the sensors. The output signals generated by the two Hall effect sensors 555 and 560 are fed to a processor that is configured to determine the properties of the rotation based on the sensor output. As illustrated, the two Hall effect sensors 555 and 560 are spaced apart on the rotary encoder 500 platform such that when Hall effect sensor 555 is positioned directly below polarity sector 515, Hall effect sensor 560 is positioned below the boundary of polarity sectors 520 and 525. This offset between the two Hall effect sensors 555 and 560 creates a phase differential between the outputs signals generated by the two Hall effect sensors. This phase differential is then utilized in the processing of these two signals to determine the rotation properties of the rotary encoder 500.

FIG. 6 illustrates two waveforms corresponding to output signals generated by a rotary encoder according to various embodiments, such as the rotary encoder 500 described with respect to FIG. 5. Rotary encoder 500 generates two output signals, 615 and 620, each originating from one of the two Hall effect sensors 555 and 560. As illustrated in FIG. 6, the two output signals 615 and 620 are quadrature signals that are 90 degrees out of phase. As described above, the ordering of the edges in the two signals 615 and 620 indicates the direction of the rotation of the rotary encoder 500. For instance, by rotating the multipole ring magnet 505 in the counter-clockwise direction 565, output signals 615 and 620 are generated, with the ordering of these two signals reflecting that direction of rotation.

Similar to the conventional rotary encoders described above, the tactile feedback provided by embodiments such as rotary encoder 500 is represented in the output waveforms 615 and 620. Two stable positions 605 and 610 in the rotation of the multipole ring magnet 505 are illustrated in FIG. 6. In each of the stable encoder positions 605 and 610, the multipole ring magnet 505 has a pole of opposite polarity next to each stationary magnet 540, 550. FIG. 5 illustrates one such stable position. When the multipole ring magnet 505 is rotated in any angle and released, it is configured to snap into a stable position, due to the magnetic force interaction between the multipole ring magnet 505 and stationary magnets 540, 550.

According to embodiments such as described with respect to FIGS. 5-6, a rotary encoder is described that provides magnetic rotation detection and generates tactile feedback using magnetic forces. Embodiments further provide the ability to provide both magnetic detection and magnetic tactile feedback using a single multipole ring magnet. Embodiments do not rely on mechanical detent structures to create tactile feedback. Instead, by contactless magnetic forces to create tactile feedback, embodiments create tactile feedback without relying on mechanical structures that wear out over time. Furthermore, the use of magnetic detents for tactile feedback avoids problems in conventional rotary encoders that are caused by corrosion, dirt and foreign matter. By avoiding the use of mechanical detent structures, simplified manufacturing processes can be implemented that do not require design of complex interlocking three-dimensional structures. Additionally, magnetic detents can provide detent force characteristics that are not practical to achieve mechanically.

Another advantage provided by embodiments is that ability to provide greater sensing bandwidth. As described with respect to FIG. 4, conventional rotary encoders that utilize metallic brushes require a masking time to allow for settling of the encoder output. This resulting delay typically limits sensing bandwidth in conventional encoders to less than 1 kHz. Embodiments utilizing magnetic detents do not require time for mechanical components such as brushes to settle such that a steady output signal is generated. Consequently, embodiments provide greater than 20 kHz sensing bandwidth.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A rotary encoder providing tactile feedback, the rotary encoder comprising:
    a multipole ring magnet having sectors of alternating, one and another magnetic polarities and uniform widths;
    two stationary magnetic field sensor integrated circuits configured to detect a magnetic field generated during the rotation of the multipole ring magnet, the two stationary magnetic field sensor integrated circuits being spaced apart so that when one integrated circuit is positioned on a sector the other integrated circuit is positioned between sectors; and
    a stationary magnet of one polarity configured to interact with the poles of the multipole ring magnet to generate tactile feedback in rotation of the ring magnet, the stationary magnet having a width substantially the same as the uniform widths of the sectors.

2. The rotary encoder of claim 1, in which the magnetic field sensor integrated circuits are Hall effect sensors.

3. The rotary encoder of claim 1, in which the magnetic field sensors generate output signals that encode the properties of the rotation of the multipole ring magnet.

4. The rotary encoder of claim 1, including plural stationary magnets of one polarity, and in which the stationary magnets are separated along the multipole magnet ring by an integer number of sectors of the multipole ring magnet.

5. The rotary encoder of claim 1, in which the magnetic field sensor integrated circuits generate quadrature signals.

* * * * *